United States Patent [19]

Tsatalos et al.

[11] Patent Number: 5,600,829
[45] Date of Patent: Feb. 4, 1997

[54] COMPUTER DATABASE MATCHING A USER QUERY TO QUERIES INDICATING THE CONTENTS OF INDIVIDUAL DATABASE TABLES

[75] Inventors: Odysseas G. Tsatalos; Marvin H. Solomon; Yannis E. Ioannidis, all of Madison, Wis.

[73] Assignee: Wisconsin Alumni Research Foundation, Madison, Wis.

[21] Appl. No.: 300,670

[22] Filed: Sep. 2, 1994

[51] Int. Cl.$^6$ ............................................. G06F 17/30
[52] U.S. Cl. ................................. 395/602; 364/DIG. 1; 364/2822.1; 364/283.4; 364/283.3
[58] Field of Search .................. 395/600; 364/DIG. 1

[56] References Cited

U.S. PATENT DOCUMENTS

| | | | |
|---|---|---|---|
| 5,201,047 | 4/1993 | Maki et al. | 395/600 |
| 5,261,093 | 11/1993 | Asmuth | 395/600 |
| 5,367,675 | 11/1994 | Cheng et al. | 395/600 |
| 5,423,035 | 6/1995 | DePrez | 395/600 |
| 5,426,781 | 6/1995 | Kaplan et al. | 395/600 |
| 5,440,735 | 8/1995 | Goldring | 395/600 |
| 5,446,886 | 8/1995 | Li | 395/600 |
| 5,454,106 | 9/1995 | Burns et al. | 395/600 |

OTHER PUBLICATIONS

Implementation Techniques of Complex Objects, Valduriez et al., MDD, Austin TX Aug. 1986 pp. 101–109.
Indexing in an Object–Oriented DBMS, David Maier et al., 1986 IEEE. pp. 171–182.
The Objectstore Database System, Lamb et al., Oct. 1991, vol. 34, No. 10/Communications of the ACM. pp. 50–63.
Query Processing in the ObjectStore Database System, Orenstein, et al., ACM Sigmod 1992. pp. 1–24.
Computing Queries from Derived Relations, Larson et al., Proceedings of 13th VLDB Conference, Brighton 1987. Pp. 259–269.
Query Transformation for PSJ–queries, Yang et al., Proceedings of 13th VLDB Conference, Brighton 1987. Pp. 245–254.
Access Path Selection in a Relational Database Management System, IBM Research, San Jose, CA 1979. Pp. 82–93.
Updating Derived Relations: Detecting Irrelevant and Autonomously Compatible Updates, Blakeley et al., ACM Transactions on Database Systems, vol. 14, No. 3, Sep. 1989. Pp. 368–401.
Access Support in Object Bases, Kemper et al., 1990 ACM, pp. 364–373.
Advanced Query Processing in Object Bases Using Access Support Relations, Kemper et al, Proceedings of 16th VLDB Conference, Brisbane, Australia 1990. Pp. 290–302.
On the Membership problem for Functional and Multivalued Dependencies in Relational Databases, Beeri. ACM Transactions on Database Systems, vol. 5, No. 3, Sep. 1980. Pp. 239–259.
Unary Inclusion Dependencies have Polynomial Time Inference Problems, Kaneflakis et al., 1983 ACM. Pp. 264–277.
Indexing Techniues for Queries on Nested Objects, Bertino et al., 1989 IEEE. Pp. 198–214.
Storage and Access Structures to Support A Semantic Data Model, Chan et al., VLDB 1982. Pp. 308–316.

*Primary Examiner*—Thomas G. Black
*Assistant Examiner*—Jean R. Homere
*Attorney, Agent, or Firm*—Quarles & Brady

[57] ABSTRACT

A database system that provides independence between the query and physical structure of the database tables by captioning each database table with a partial query reflecting the contents of that table. In particular, the partial query is a query that if applied to a larger database of a standard configuration would produce the data of the table. Relevant tables for a particular query may be identified by piecing together the partial queries until the user query is obtained. The database system may be integrated with an optimizer by comparing each of the identified tables against the others for the amount of overlap their sub-queries have with the user query and the cost of accessing the table and then repeating this process as the tables are joined in various combinations.

8 Claims, 5 Drawing Sheets

FIG. 17 $\pi_{AC}(R)$ JOIN S: A B C D — 1 1 i I ; 1 2 i II ; 1 1 ii I ; 1 2 ii II

FIG. 18 R JOIN S: A B C D — 1 1 i I ; 1 2 ii II

FIG. 19 $\pi_{AC}(R) \oplus S$: A C — 1 i ; 1 ii

FIG. 20 T: A B D — 1 1 I ; 2 3 II

FIG. 21 T JOIN R: A B C D — 1 1 i I

FIG. 22

COMPUTER DATABASE MATCHING A USER QUERY TO QUERIES INDICATING THE CONTENTS OF INDIVIDUAL DATABASE TABLES

This invention was made with United States Government support awarded by: NSF Grants #IRI-911376, IRI-9224741, IRI-9157368, U.S. Army Contract DAA B07-92-C-Q508. The United States Government has certain rights in this invention.

FIELD OF THE INVENTION

The present invention relates to computer databases storing data and retrieving stored data in response to queries by a user. In particular, the invention relates to a computer database permitting the drafting of queries without reference to the physical structure of the data in computer memory.

BACKGROUND OF THE INVENTION

Computer databases are used for the storage and rapid retrieval of large amounts of data. Typically, a computer database includes a computer which executes a database program to write to and read data from a large computer accessible memory. The particular data read from the memory is determined by a user query. In response to the user query, the database produces a report listing database data having selected characteristics.

For example, a university may use a computer database to store information about its students and courses. In response to a user query, the computer database can generate a report indicating the names of the students in particular courses. In order to produce this report, the database must record not only student names and courses ("attributes") but also "relations" between the attributes—in this example, which students "attend" which courses.

LOGICAL STRUCTURE OF DATA IN A DATABASE

The data of a database may be thought of as being arranged in one or more tables having columns of attributes and rows linking attributes together according to their relations. In the above example, the database may have a table with a first column containing student names and a second column containing courses. The student and course in the same row are implicitly linked by a relation indicating that the student named in the first column of that row "attends" the course identified in the second column of that row.

PHYSICAL STRUCTURE OF DATA IN A DATABASE

As a practical matter, when the data of a table is stored in computer memory, each data element is assigned to a particular memory address based on its row and column in the table. For example, an addressing scheme is adopted in which the first row of the table occupies a first N consecutive memory locations in memory and the second row of the table occupies a second N consecutive memory locations after the first row. In this way the relations and attributes of the data are clearly preserved by the data's address without the need for storing additional identifying data.

Further, normally it is desirable that related data of a table be stored in computer memory at adjacent memory addresses. This grouping simplifies and speeds access of related data. For example, if the data of a table is stored on a hard disk at consecutive sectors and consecutive tracks, less motion of the disk read head is required, permitting the data to be recovered much more quickly.

As a result, the physical structure of the data in memory (i.e. its allocation among the addresses of the computer memory) becomes intimately associated with the logical structure of the data (i.e. how the data is allocated among tables and rows and columns of that table).

RELATIONAL DATABASES

For large databases with many attributes, a single table can waste computer memory. For example, if the attributes of a database having attributes: STUDENTS, COURSES and FACULTY, is stored in a single table, faculty information is needlessly repeated for each row describing a course taught by that faculty member. This repetition of data is minimized in "relational" databases in which multiple tables are employed implicitly linked by the relations between some of their attributes. For example, a first table having the attributes of STUDENTS and COURSES in its two columns could be linked to a second, much shorter, table having attributes of COURSES and FACULTY. When information concerning students and faculty are required, an operation called join is undertaken which searches the two tables for rows that match on an attribute called the "join attribute"—in this case COURSE.

Users may request information from a relational database by means of a query which describe a sequence of "join" operations which link the data of two or more tables within the database, followed by "selection" and "projection" operations. The selection operation indicates the range of a desired attribute value in the report to be generated, e.g. students having names from A to L, and thus effectively remove rows from the joined tables. The projection operation defines the desired attributes to be contained in the report, e.g. students and faculty but not courses and thus effectively trims columns from the report.

Constructing the query normally requires that the physical division of the data into tables be known so that the join operation may recite the necessary tables to be joined. Considerable effort may be invested in writing queries that generate standard reports from the database.

OPTIMIZERS

How quickly a query may be answered by a computer database depends on how the query is structured. For example, if a query requests a list of all students whose name begins with 'X' and who have a passing grade average, it is likely to be most efficient to search first for rare members of the class of students with names that begin with 'X' and then to search these limited class members for students with passing grades, rather than the reverse. Such decisions about search approaches are made by query optimizers, known in the art, which evaluate statistics maintained by the database to reformulate a query for improved execution speed.

PHYSICAL DATA INDEPENDENCE

As alluded to above, the speed with which a query is processed can also depend on the physical structure of the data in computer memory. For example, a query seeking a list of STUDENTS in the anthropology DEPARTMENT is relatively simple if the STUDENT and DEPARTMENT data is stored as a single physical table having columns of STUDENTS and DEPARTMENTS and rows linking STU- DENTS to their DEPARTMENTS. Such a search is much more complicated and time consuming if the table is stored physically as three tables, for example, one linking STUDENTS to COURSES, one linking COURSES to FACULTY and one linking FACULTY to DEPARTMENTS. Further, if the single table having STUDENTS and DEPARTMENTS is sorted or indexed according to DEPARTMENT, this will provide a faster search than a table in which DEPARTMENT is unsorted.

Generally there is no one physical structure of a database that will be optimum for all queries. For this reason, large databases are usually monitored by a database administrator who decides whether the physical structure of the database accurately reflects the type of queries being received. If not, a new physical structure may be required.

Unfortunately, changing the physical structure of the database is not always practical. Although restructuring database data is a relatively straightforward task, it normally requires rewriting any existing queries to reflect the new physical structure. This latter task is often prohibitively burdensome.

Ideally, a database would provide for the drafting of queries in a manner that made their form independent of the physical structure of the data stored in the database. In this way, the database administrator would have complete flexibility in restructuring the physical data to better meet an evolving mix of queries.

SUMMARY OF THE INVENTION

The present invention provides a computer database that permits the physical structure of the data in the database to be freely changed without the need to rewrite existing queries. This flexibility is accomplished by associating each physical table of data in memory with a sub-query that describes the contents of the table in the form of a query of a standard database. When a query from a user is received, these sub-queries are examined and pieced together until the user query has been duplicated. The tables associated with the selected sub-queries are those tables necessary to respond to the user query.

Specifically, the database includes at least two tables that are stored in memory and that have physical structures that link data of particular attributes together according to relations. A sub-query is associated with each table, the sub-query being a query that would produce the table if the sub-query were being made of a standard database. A program operating on an electronic computer communicating with the database memory accepts a user query from a user and compares it to the sub-queries of the tables to generate a list of tables, where each sub-query includes a portion of the user query.

Thus, it is one object of the invention to provide a means for automatically identifying tables needed to respond to a query and thereby eliminate the need for the user, writing the query, to know the physical structure of the tables. Linking each table to an identifying sub-query clearly indicates the relevance of that table to the query as expressed in the overlap between the sub-query and the user query.

The relevant tables of the list may be joined together to create a new query equivalent to the user query but addressed to the physical structure of the tables on the list.

Thus it is another object of the invention to provide a query pre-processor that may be used with existing databases to translate a user query into a form that permits the physical structure of the database to be changed in the future without modification of user queries.

Alternatively each sub-query of the tables on the list may be assigned a search cost reflecting the difficulty of obtaining the data of the sub-query. Tables may be removed from the list if their sub-query both includes a smaller portion of the user query and has a greater search cost than another sub-query. Further, sub-queries of tables still on the list may be joined to produce joined sub-queries. Tables of joined subqueries may be removed from the list if their joined sub-queries both include a smaller portion of the user query and have a greater search cost than another joined sub-query.

Thus it is another object of the invention to provide a database system having queries with physical data independence that may be further optimized to provide rapid access of data.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Database Hardware

Figures 1, 2:
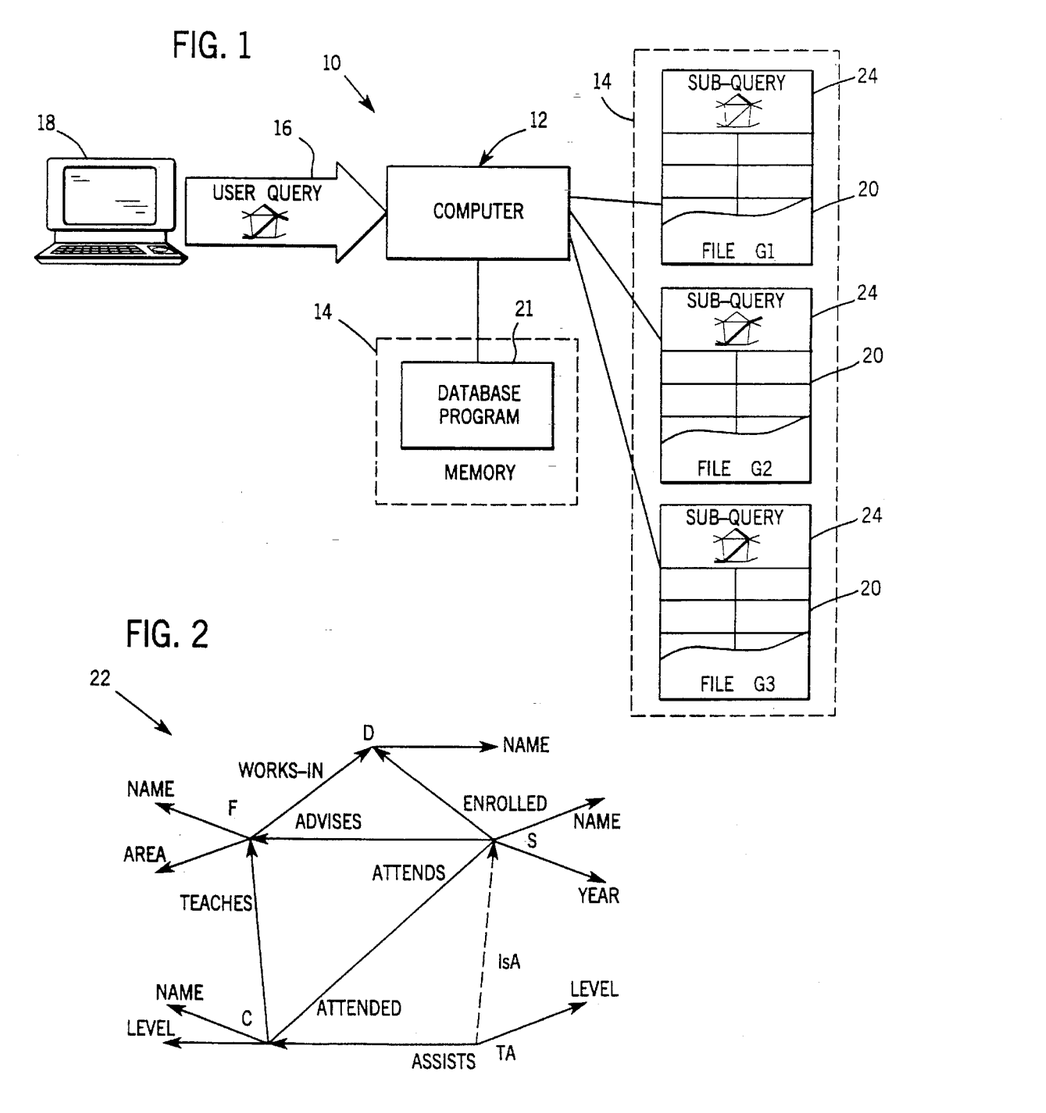
FIG. 1 is a block diagram showing the database of the present invention in which a computer receives a user query and seeks the information from a set of tables G1, G2 and G3 in memory, each table having a sub-query.
FIG. 2 is a diagram of the data of the logical structure of the database of FIG. 1 representing the attributes of the data as nodes and the relation between the attributes as lines between nodes.

Referring to FIG. 1, the database 10 of the present invention includes an electronic computer 12 having an internal processor (not shown) and communicating with memory 14 holding a database program 21 and database data divided among one or more tables 20. The memory 14 may include random access memory directly accessible by the computer 12 and/or memory devices such as hard disks or magnetic tapes.

During operation of the database 10, computer 12 receives a user query 16 from a data entry device 18 such as a remote terminal, as is well understood in the art. The user query is processed by the computer 12, operating according to the database program 21, which leaves one or more tables 20 contained in the external memory 14 to return data from those tables 20 relevant to the user's query 16.

Logical Schema of the Database

Referring to FIG. 2, the data of the database 10, as allocated among tables 20, may, for example, describe a university and its personnel. Thus, the database 10 may contain data of the attributes: DEPARTMENTS, FACULTY, STUDENTS, COURSES and TEACHING ASSISTANTS (abbreviated D, F, S, C, and TA, respectively) and represented as vertices of the graph of FIG. 2.

The database also indicates relations between the attributes indicated by the lines between the vertices of FIG. 2. Thus, the line between STUDENT and COURSE indicates that the student ATTENDS the course.

In the example of FIG. 2, the S is associated with a text string NAME and an integer YEAR for the student by simple unlabeled relations. The faculty, F, are associated with a text string NAME and a text string of the AREA in which the faculty works. COURSE is associated with text string NAME and an integer LEVEL number denoting the difficulty of the course. DEPARTMENT is associated with a text string NAME, and TEACHING ASSISTANT is associated with an integer LEVEL.

More complex and labeled relations link FACULTY to DEPARTMENT by means of a WORKING relation, STUDENT to DEPARTMENT by means of an ENROLLED relation, COURSE to STUDENT by means of ATTENDED relation, STUDENT to FACULTY by means of an ADVISES relation, COURSE to FACULTY by means of a TEACHES relation and STUDENT to COURSE by means of an attends relation, and TA to COURSE by means of an ASSIST relation.

Functional dependencies between attributes are indicated by arrow heads of the relation lines pointing to the functionally dependent attribute. Thus, for example, a student identification number, indicated by the node S, is related to a single student NAME and thus an arrow points from S to NAME. To the contrary, however, a single student NAME may map to more than one student identification number, if there are multiple students with the same name, and so no arrow goes in the direction from NAME to S. Specific functional relations will be mentioned as required.

The diagram of FIG. 2 defines the logical schema 22 of the database but is unrelated to the physical structure of the database reflected in the patterns of storage of the data of tables 20 in memory 14. Thus, FIG. 2 shows that the database provides information as to which students attended which course and which faculty teaches which course, however, FIG. 2 does not demand that there be a single table having columns of student course and faculty. The diagram of FIG. 2 will also admit to, for example, two tables, one having students and courses and one having courses and faculty.

A User Query within the Logical Schema

Figure 3:
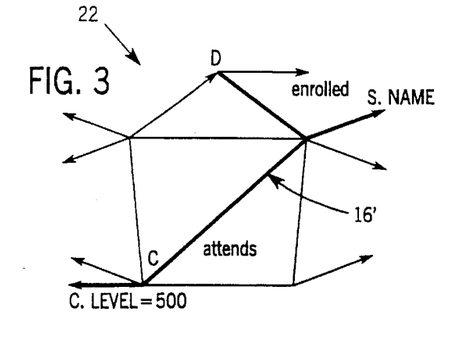
FIG. 3 is a diagram similar to that of FIG. 2 showing a query that might be submitted to the database of FIG. 1 as superimposed on the logical structure of the database.
Figure 7:
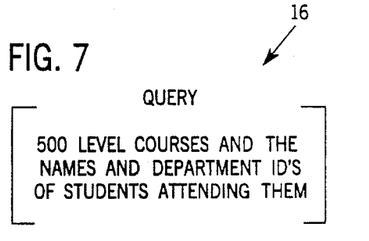
FIG. 7 is a prose version of a query that might be submitted to the database of FIG. 1 as would be represented by FIG. 3.

Referring now to FIG. 3 and 7, given the logical schema of FIG. 2, a user query 16 may, for example, ask for a list of all 500 level courses, the names of the students (S) ATTENDING those courses (C) and the department identification (D) of those students. Such a query might be produced in a form similar to the well known STRUCTURED QUERY LANGUAGE (SQL) as follows:

def_query Q by select Student.name, Dept
      where Student attends Course and
        Student enrolled Dept and Course.level = 500 where Student.name indicates the NAME attribute associated with student (S), henceforth indicated as S.NAME.

The above query may be represented by a graph 16' (in thick lines) forming a part of the logical schema 22 (thick and thin lines) shown in FIG. 3. The query seeks four attributes: departments (D), student names (S.NAME), courses (C) and course level (C.LEVEL). The query also requires relation of ENROLLED, linking students to departments, and ATTENDS, linking students to courses. In the preferred embodiment, the user query 16 is a psj-query, meaning that it is formulated as the joining of two or more tables followed by a selection and projection of the attributes of the joined tables, where each of these operations could be omitted.

Importantly, the user query 16 is specific to the particular logical schema represented by the graph 22 of FIG. 2. For example, the query implicitly recognizes that there is no direct relation between COURSES and DEPARTMENTS but that it must use the intermediate attribute of student (S) to make such a connection.

Physical Structure of the Database and Sub-queries

Referring now to FIG. 1, the data necessary to satisfy the query of FIG. 7 and FIG. 3 may be found arbitrarily among the tables 20 within the memory 14. Because one goal of the invention is to permit the makeup of the table 20 to be varied without changing the user query 16, it is necessary that the computer 12 identify the relevant tables 20 needed to satisfy the query even though the tables are not named by the query itself.

The present invention permits this automatic identification of relevant tables 20 by associating with each table 20 in memory 14, a sub-query 24 that identifies the contents of the table with which it is associated and which may be used to identify relevant tables 20 and to join, select and project the data from those tables as has been previously described to produce a response to the user query 16.

Figure 4:
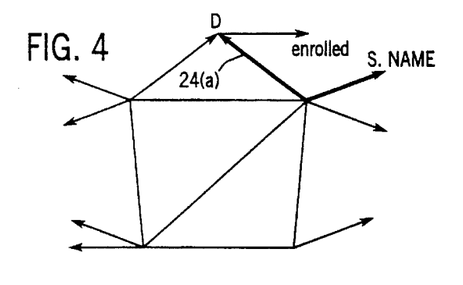
FIG. 4 through 6 are diagrams similar to that of FIG. 2 showing sub-queries attached to each of the tables G1, G2, G3 of FIG. 1 indicating the contents of those tables superimposed on the logical structure of the database and demonstrating the similarity between queries and descriptions of tables.
Figure 8:
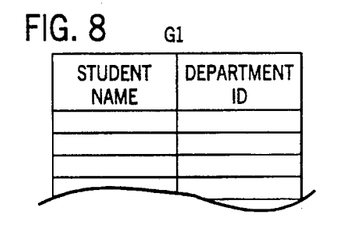
FIG. 8 through 10 are tabular representations of the data stored in the tables G1 through G3 of FIG. 1 as represented by the sub-queries of FIG. 4 through 6, respectively.
Figure 9:
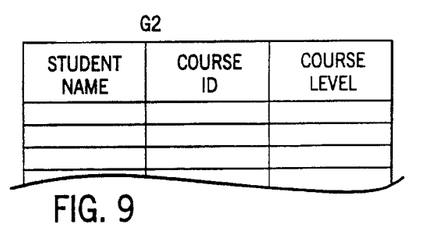
Figure 10:
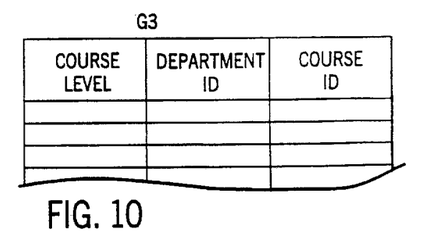

Continuing with the above example, memory 14 holds three tables 20 whose structures are indicated in FIGS. 8, 9 and 10 as follows. Table G1 provides the attributes of student name (S.NAME) and department (D) linked into rows by the relation of ENROLLED. The sub-query 24(a), reflecting the contents of G1, is shown in FIG. 4 and includes the relation of ENROLLED and the attributes of S.NAME and department (D).

Figure 5:
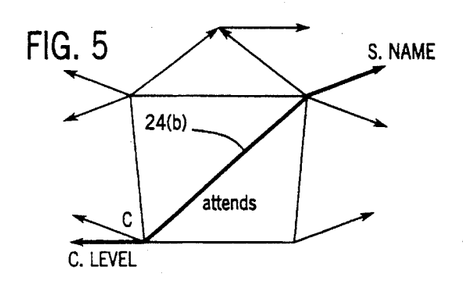

As shown in FIG. 9, table G2 includes the attributes of S.NAME, course (C) and C.LEVEL linked together by the ATTENDS relation. The sub-query 24(b) reflecting the contents of table G2, as shown in FIG. 5, reflects these attributes and relations.

Figure 6:
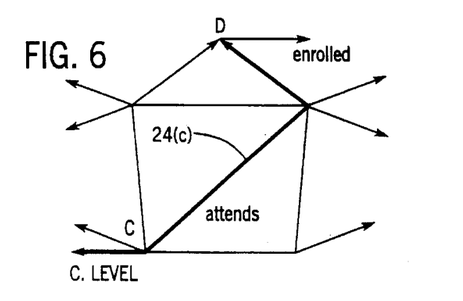

Finally, table G3 includes the attributes of C.LEVEL, department (D) and course (C) linked together in a row by means of the relations: ATTENDS and ENROLLED. The sub-query 24(c) for table G3 is shown in FIG. 6.

The Database Program

A. Identifying Relevant Tables

Figure 11:
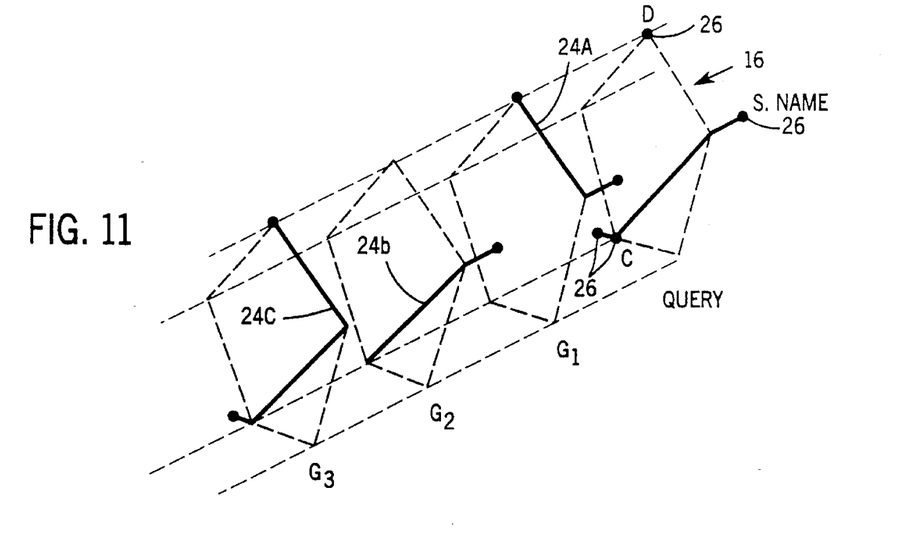
FIG. 11 is a perspective diagrammatic view of the piecing together of the sub-queries of each of the tables G1 through G3 of FIG. 1 and FIGS. 4 through 6 to match the query of FIG. 3 thus identifying the relevant tables for answering the query.
Figure 12:
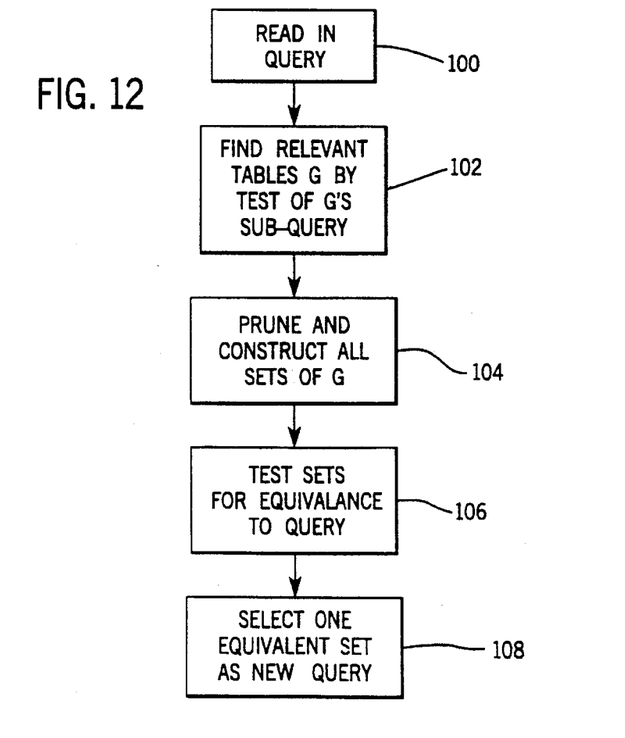
FIG. 12 is a flow chart of the steps taken by the computer of FIG. 1 in selecting tables to answer a query.

Referring now to FIGS. 11 and 12, this use of sub-queries 24 to describe the contents of the tables 20 permits the identification of relevant tables 20 to a user query 16 by a piecing together of sub-queries 24 to produce the user query 16.

As indicated by process block 100, the first step in retrieving data from the database 10 is the acceptance of a user query 16. Specifically, the user query 16 in this example requires the data of four attributes of: department (D), S.NAME, course (C) and C.LEVEL and considers four relations ENROLLED, ATTENDS, and the primitive relations linking student (S) to S.NAME and course (C) to C.LEVEL. Thus, G1 through G3 must be evaluated to see whether they provide necessary data in completing this user query 16.

As indicated by process block 102 this evaluation entails comparing the graphs of the sub-queries 24(a)–(c) of tables G1 through G3 to the graph of the user query 16 to see if individually or in combination, the sub-queries 24 can be fitted together to produce the graph of the user query 16 and hence that tables G1 through G3 can be combined to produce the data required by user query 16.

Principally, in order to be relevant to the user query 16, a table G1 through G3 must have at least a portion of the information needed by the user query 16 in terms of attributes or relations and must be complete with respect to the information needed by the query for those common attributes and relations. Specifically, each query is subject to the following test:

where $G$ is the set of all tables 20

$$H = \{G \in G \text{ such that } G_p \cap A(Q_r \cap G_r) \neq 0 \text{ and} \quad (1)$$

$$G_s[attr \in A(Q_r)] \cup Q_s[attr \in G_p] = \quad (2)$$

$$Q_s[attr \in A(G_r)] \text{ and} \quad (3)$$
$$G \text{ covers } Q_r\}$$

where $Q_r$, $Q_s$, and $Q_p$ are respectively the join, selection, and projection arguments of the user query 16;

$G_r$, $G_s$, and $G_p$ are join, selection, and projection arguments of a sub-query; and where the function $A(R)$ produces the set of attributes corresponding to relations R.

This test first checks each of the sub-queries of tables G1 through G3 to see if the respective table has some aspect in common with data sought by the query. More specifically, the sub-query 24 must have a relation in common with the user query, with at least one of the attributes of this relation included in the projection of the sub-query 24. These requirements are represented by the notation of line 1.

Line 2 considers whether the query's selection on those attributes shared with the table G1 through G3 are target attributes of the table G1 through G3, that is, appear as columns in the table 20 and thus that the query selections may be applied to the attributes of the table G1 through G3 or that the table G1 through G3 has the same selection as the user query 16 for those attributes.

Line 3 considers whether the table G1 through G3 "covers" those relations it has in common with the query. This condition of covering ensures that the table 20 has all the information needed by the query. Generally a query Q covers a set of relations R if $$Q[rel \in R] \equiv \pi_{A(R)}(Q)$$

where $Q[rel \in R]$ are the relations of the query found in the set R and where the $\pi_A(\ )$ operator is the projection operator taking the projection of attributes A in its subscript on its argument.

Figure 13:
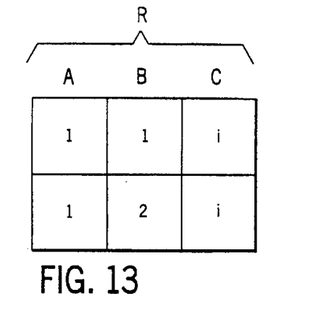
FIGS. 13 through 21 are tabular representations of the data of various tables used to illustrate the operations of natural join, add-join and the condition of cover.
Figure 14:
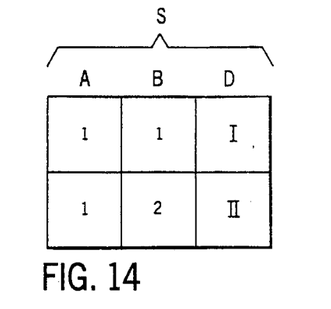
Figure 18:
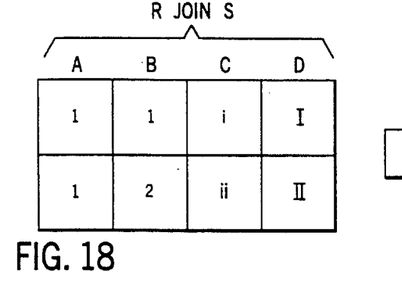

An example of the condition of "cover" is provided with reference to FIGS. 13, 14 and 18. Two simplified tables R and S are shown in FIGS. 13 and 14 respectively having two rows of attributes A, B, C (for table R) and attributes A, B, and D (for table S). In the natural join of tables R and S, attributes A and B are identified as common attributes to the tables and a new table is created (shown in FIG. 18) having attributes A, B, C and D. Each combination of A and B found in either of Tables R or S will be represented in the columns for attributes A and B. The values of C and D will be those corresponding to the values of A and B in those rows.

Figure 20:
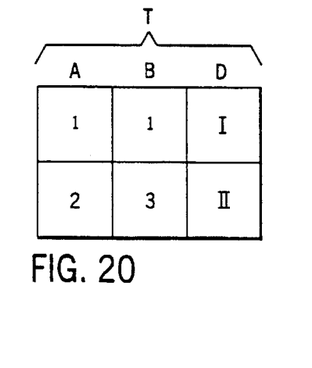
Figure 21:
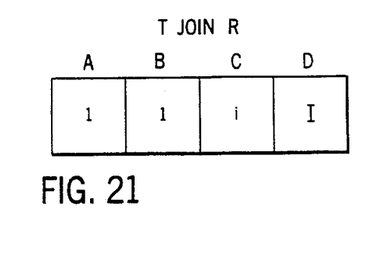

Here the join of tables R and S (shown in FIG. 18) "covers" the relations between attributes A and B because a projection for attributes A and B of that relation on the table of FIG. 18 reveals all of the relevant relations (rows) found in tables R and S individually. In contrast, the join of table R and table T (the latter shown in FIG. 20) produces the table shown in FIG. 21 which does not cover the relationships between A and B because the process of joining deletes the second row from each table R and T which is unique to the table and thus does not survive the join. Thus the projection of the attributes A and B on the resulting table of FIG. 21 does not reveal all the relationships (rows) of tables R and T.

The coverage test can detect whether all attribute values survive the join without looking at the data of the table. It employs information similar to functional dependencies, called "inclusion dependencies". This information is part of the standard database.

B. Identifying Combinations of the Relevant Tables

Referring still to FIG. 12, the next step of the table search procedure, indicated by process block 104, takes each of the relevant sets G1 through G3, prunes them to include only the relations and attributes shared with the user query 16, and groups them into sets representing all possible combinations of G1 through G3. Each of these combinations is then tested to see whether it provides a complete data needed by the user query 16 as follows. Specifically, $$\text{for each subset } \{G_1, \ldots G_n\} \text{ of H do} \quad (4)$$

$$\text{let } S = \{\pi_{A(Qr)}\sigma_{Qs}G_1, \ldots \pi_{A(Qr)}\sigma_{Qs}G_n\} \quad (5)$$

$$\text{while there are } G, H \in S \text{ such that } G \text{ join } H \equiv G \oplus H \quad (6)$$

$$\text{replace } G \text{ and } H \text{ in } S \text{ with } G \text{ join } H \quad (7)$$

if $\pi_{Qp}S=Q$ then accept the current subset of H as a solution where the $\sigma_a(\ )$ operator is the select operator selecting a range of attributes from its argument set based on the range of its subscript a, and where join is a natural join operator and ⊕ is an add-join operator where P ⊕ Q=<$P_r \cup Q_r, P_s \cup Q_s, P_p \cup 0 Q_p$>.

An example of the distinction between a natural join and an add-join is provided with reference to FIGS. 13 and 14. As described above, the natural join of tables R and S has attributes A, B, C and D as shown in FIG. 18. The add-join of tables R and S produces, in this case, the same result: the table of FIG. 18.

Figure 15:
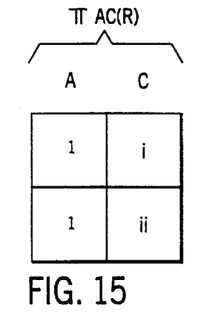
Figure 16:
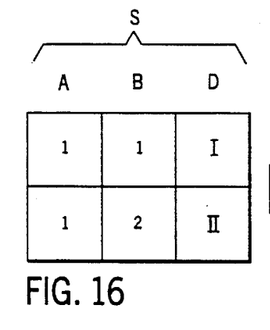
Figure 17:
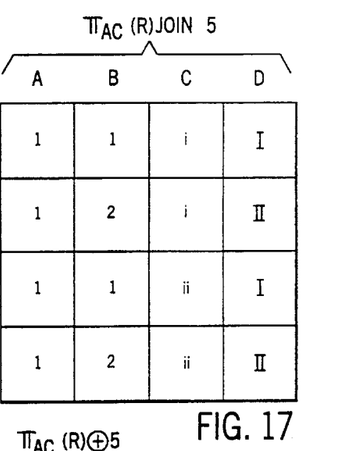

Referring however to FIGS. 15 and 16, if one of the tables is projected for the attributes of A and C as shown in FIG. 15 (projections eliminating columns of the tables), the natural join performs the projection prior to the join operation. Hence, $\pi_{AC}(R)$ join S is the projected table R joined to the table S as shown in FIG. 17. Here the resulting joined table of FIG. 17 has four rows because the projected version of table R, missing column B, may have each of its rows joined to each of the rows of the table S without conflict in the single joining attribute of A.

Figure 19:
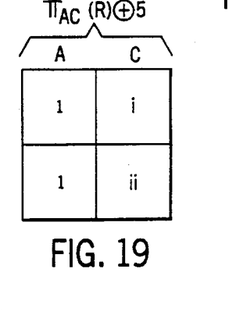

In contrast, an add-join differs from a natural join primarily in that the projections are undertaken after the joins of the raw tables. Thus, referring to FIG. 18, the add-join of the table R projected for attributes A and C as shown in FIG. 15 and table S first joins tables R and S without projection as shown in FIG. 18 and then projects the resulting table as shown in FIG. 19. Here the resulting table has only two rows. Thus, when one or more of the sub-queries 24 of the tables includes a projection, the natural join and the add-join may differ.

At line 6 of the above described test of the subsets of G1 through G3, the natural join and the add-join of the sub-queries of each pair of tables G1 through G3 are compared to see if they are equivalent. If so, the two table sub-queries are replaced by the natural join of their sub-queries. The set of sub-queries of tables thus keeps reducing. At some point, the set can no longer be reduced either because there is only one sub-query left or because there is no pair of sub-queries that satisfies the text of line 6. In the latter case, the subset chosen at line 4 is rejected.

In the former case, the remaining sub-query is of the form:

$$\pi_{Qp}\sigma_{Qs}(\pi_{A(Qr)}G_a \text{join} \ldots \text{join} \pi_{A(Qr)}G_n) \quad (8)$$

where $G_a$–$G_n$ are relevant tables G1 through G3 as described above.

C. Generating a New Search Directed to the Physical Tables G

Referring to FIG. 12 and process block 106, each of the collected subsets must then be tested for equivalency to the user query 16.

In this regard, the invention recognizes that for a psj-query user query Q and a set of psj-query sub-queries G selected to be in a subset per the above, that $$Q = \pi_{Qp}\sigma_{Qs}(\pi_{A(Qr)}G_1 \text{join} \ldots \text{join} \pi_{A(Qr)}G_1)$$

hence by one additional projection step $\pi_{Qp}$ the remaining sub-query of (8) may be checked for syntactic equivalence with the user query 16. The expression $\sigma_{Qs}(\pi_{A(Qr)}G_1 \text{join} \ldots \text{join} \pi_{A(Qr)}G_1)$ which indicates the necessary tables G1 through G3 is then substituted for the user query 16 and used to conduct a search on these tables 20 to respond to the user query as indicated by process block 108.

EXAMPLE I

Referring now to FIGS. 3 through 10, in the present example, all three tables G1 through G3 are relevant to the query and pass the test of lines 1 through 3. For example, G1 can provide the value for two attributes needed by the query (department (D) and S.NAME) so it passes line 1. It also satisfies the constraint test of line 2 (it has no selection) and it "covers" the relations ENROLLED and S.NAME so it passes the test on line 3.

After each of the tables G1 through G3 have been identified per process block 102, they are pruned and combined to construct all possible sets of G per process block 104. Each of these sets is then tested at process block 106. Consider, for example, the set G1, G2. The loop of lines 6 and 7 will be executed once to check whether G1 join G2 equals G1 ⊕ G2. This test will fail unless S.NAME functionally determines student (S). Otherwise, two tuples that join on the S.NAME need not join on their student (S) as well. If S.NAME functionally determines student (S), then the join on the student (S) is irrelevant: one can project out that attribute before performing the join which implies that the add-join is equivalent to the natural join as tested for in line 6. Eventually line 8 of the test will conclude that the candidate solution of the set G1, G2 is a correct one.

Following the same procedure, the program rejects the subsets G1, G3 and G2, G3 because the linking attributes are missing. However, the combination {G1,G2,G3} is a correct solution.

During the course of the loop of lines 6 and 7, the program will test all pairs of tables 20 in each set to check whether or not there add-join is equivalent to the natural join. All of the pairs will fail except G1 ⊕ G2. In the next iteration, the pair G1 ⊕ G2, G3 is considered and it is confirmed that its add-join is equivalent to its natural join.

Use with an Optimizer

The net result of the above steps (1) to (3) is to produce a psj-query that is in all respects equivalent to the user query but that may be simply applied to the tables 20 within the database. Generally, however, there will be more than one set of tables 20 that may be combined to provide the necessary information of the query. Thus it is desirable to optimize the new query by selecting from among the different possible combinations of tables 20 those that may be most efficient.

Figure 22:
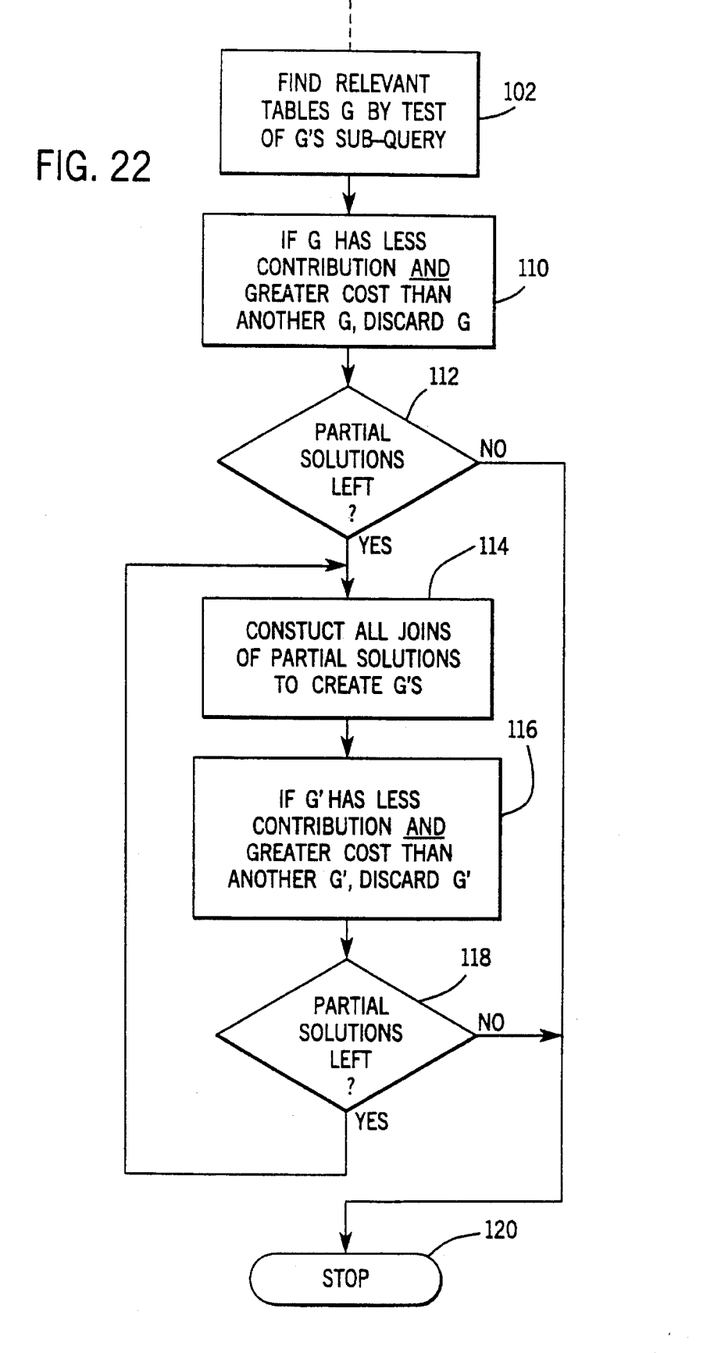
FIG. 22 is a flow chart continuing a portion of the flow chart of FIG. 12 showing a method of optimizing the query produced by the present invention.

Referring now to FIG. 22, the optimization process is best interleaved with the process of constructing the new query. In particular, after step 102 of FIG. 12 as has been previously described where a subset of tables G have been selected as being relevant to the user query 16, an optimizer, rather than proceeding to process block 104, proceeds to process 110 of FIG. 22.

At process block 110, each table G is examined to measure the amount of overlap it has with the user query 16 in terms of shared attributes, attribute ranges and shared relations.

An estimated cost of accessing the data in the table G is also determined. Generally, the cost of accessing the table G will depend on a number of well known parameters including the amount of data in the table, its specificity and possibly the storage medium and other factors such as the availability of indexes. Such cost factors and their use with optimizers are well known in the art.

Per process block 110, if a particular table $G_n$ has both less contribution and greater cost than another table $G_m$, $G_n$ is discarded in the optimization process.

At the conclusion of step 110, decision block 112 evaluates whether any tables G are left which provide only partial coverage of the query. If none are left, the program stops as indicated by process block 120 which necessarily means that a single table is left which provides a complete solution to the query. That is, the query can be responded to by consulting only a single table 20.

More typically, multiple tables G will be required to be joined to respond to the user query 16 and at decision block 112, the program proceeds to process block 114 and joined pairs of partial solutions are constructed.

Next at process block 116, in a manner analogous to process block 110, the joins of partial solutions, designated G', are evaluated and those that have less contribution to the user query 16 and greater cost are discarded.

Next at decision block 118 if there are no remaining tables G' that provide partial solutions, the program stops and the complete solution is used as the optimized query. Otherwise at decision block 118, the program loops back to process 114 and the partial solutions G' that remain are in turn joined to create new G' solutions for evaluation. This loop continues until a single complete solution is obtained.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. A database storing data and providing selected data in response to queries, the database comprising:

a) at least two tables of stored data having physical structures that link data of particular attributes together according to relations;

b) a sub-query in the same form as the user query, a different sub-query associated with each table and describing all of the attributes and relations of the table in query form; and c) a program operating on an electronic computer communicating with the memory to:
   (i) accept a user query for the database from a user; and
   (ii) compare the user query to the sub-queries of the tables to generate a list of only the tables where the sub-query includes a portion of the user query;
   (iii) using the list of tables to respond to the user query.

2. The database of claim 1 wherein the program operating on the electronic computer further:

(iii) generates a new query equivalent to the user query but directed to at least one table on the list; and (iv) executes the new query in place of the user query to respond to the user query.

3. The database of claim 2 wherein the program operating on the electronic computer performs step (iii) by:

(1) collecting the tables of the list into a plurality of subsets;

(2) pairwise evaluating each sub-query of the tables of a subset to see if their add-join is equivalent to their natural join, indicating that the selections of the sub-queries may be conducted after the joining of two sub-queries, and if so replacing the sub-query of that pair with the natural join of their sub-queries;

(3) repeating step (2) until no more combinations can be made; and (4) if there is only a single combined sub-query left after step (3) using a projection of the combined sub-query as the new query.

4. The database of claim 1 wherein the user query indicates desired relations $Q_r$, desired attributes $Q_p$ and desired ranges of attributes $Q_s$ of the data to be obtained from the database and step (ii) comprises:

(1) determining that the sub-query has at least one relation in common with the desired relations and at least one attribute of the relation in common with the desired attributes;

(2) determining that the sub-query has the same or greater ranges of the desired attributes; and (3) determining that the sub-query covers the desired relations, where coverage indicates that the attributes of the sub-query ensure that the desired relations will be in the table.

5. The database of claim 1 wherein the program operating on the electronic computer further:

(iii) assigns a search cost to each sub-query of the tables on the list, the search cost reflecting the difficultly of obtaining the data of the sub-query; and (iv) removes from the list tables whose sub-query both includes a smaller portion of the user query and has a greater search cost than another sub-query.

6. The database of claim 5 wherein the program operating on the electronic computer further:

(v) distinguishes between sub-queries that are complete solutions that are equivalent to the user query and sub-queries that are partial solutions that have only a portion of the user query; and (vi) if there are no partial solutions after step (iv) providing a complete solution as a new query;

(vii) executes the new query in place of the user query to respond to the user query.

7. The database of claim 5 wherein the program operating on the electronic computer further:

(v) joins sub-queries of tables still on the list to produce joined sub-queries; and (vi) removes from the list tables of joined sub-queries that both include a smaller portion of the user query and have a greater search cost than another joined sub-query.

8. The database of claim 5 wherein the program operating on the electronic computer further:

(v) distinguishes between joined sub-queries that complete solutions that are equivalent to the user query and joined sub-queries that are partial solutions that have only a portion of the user query; and (vi) if there are no partial solutions after step (iv) providing a complete solution as a new query;

(vii) executes the new query in place of the user query to respond to the user query.

* * * * *

UNITED STATES PATENT AND TRADEMARK OFFICE
CERTIFICATE OF CORRECTION

PATENT NO. : 5,600,829
DATED : February 4, 1997
INVENTOR(S) : Tsatalos et al.

It is certified that error appears in the above-identified patent and that said Letters Patent is hereby corrected as shown below:

Col. 9, line 2      "$P_p \cup 0 \; Q_p>$" should be --$P_p \cup Q_p>$--.

Signed and Sealed this

Sixth Day of May, 1997

*Attest:*

BRUCE LEHMAN

*Attesting Officer*      *Commissioner of Patents and Trademarks*